CHECKING SYSTEM

Filed Dec. 23, 1963

INVENTOR
EDWARD LOIZIDES

BY Owen L. Lamb

AGENT

United States Patent Office 3,368,203

Patented Feb. 6, 1968

3,368,203

CHECKING SYSTEM

Edward Loizides, Poughkeepsie, N.Y., assignor to International Business Machines Corporation, New York, N.Y., a corporation of New York Filed Dec. 23, 1963, Ser. No. 332,777
7 Claims. (Cl. 340—172.5)

Figure 1:
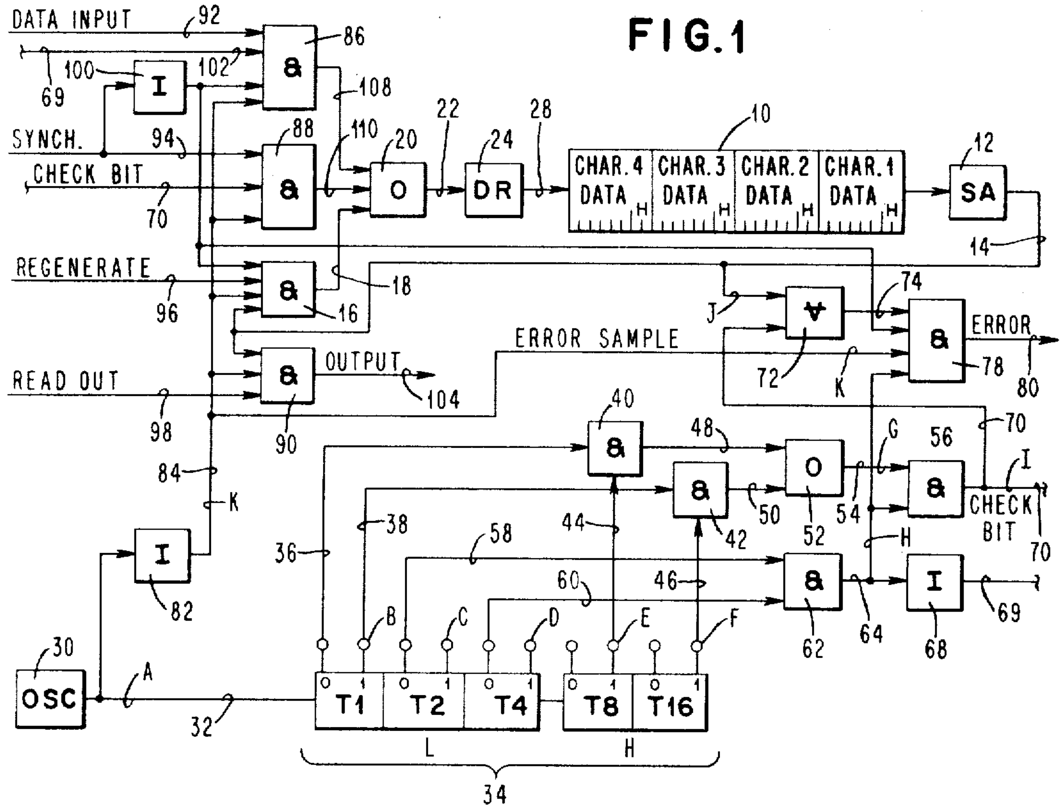

The invention relates to checking systems and more particularly to apparatus for checking the operation of a recirculating memory.

In the data handling art recirculating memories are utilized for storing digital information and making this information available at a later time. A recirculating memory may comprise, for example, a recirculating delay line, a magnetic drum, or an endless loop of tape. In a recirculating memory it is necessary to provide some means for identifying particular bits of information stored within the memory. Usually the memory is divided into unique time intervals by a timing circuit. Thus bits of information are sampled at particular time intervals in order to synchronize the data stored within the memory with external utilization apparatus. If the timing circuit fails, the uniqueness of the time intervals is lost, effectively resulting in the loss of stored information. A checking scheme which merely checks the operation of the timing circuit is not sufficient to check a recirculating memory. Any one of a number of circuits may cause the destruction of information. The failure may result in sense amplifiers which read out of the memory, driving circuits which read into the memory, or the memory itself may fail or distort the information so as to cause a loss of synchronization.

It is therefore an object of this invention to provide an improved recirculating memory.

It is a further object to provide improved apparatus for checking a timing circuit associated with a recirculating memory.

It is also an object of this invention to provide checking apparatus which will check all of the logic in addition to the timing circuits associated with a recirculating memory.

It is a still further object of this invention to provide a self-checked synchronizing apparatus for a recirculating memory.

The above objects are accomplished in accordance with the invention by providing a timing circuit which is synchronized with recirculating data bits stored in a recirculating memory. Check bits corresponding to times indicated by the timing circuit are stored in the memory between groups of data bits. Checking is accomplished by comparing the check bits read from the memory with the actual times indicated by the timing circuit. If there is disagreement, the timing circuit is not properly synchronized and the unequal comparison causes an error signal to be generated.

The invention has the advantage of serving not only as a timing circuit check, which most apparatus have, but also as a check of the recirculating storage itself, and all circuitry associated therewith. Further, apparatus constructed in accordance with the invention will detect errors caused by distortion in the signal read from the recirculating storage.

The invention has the further advantage of flexibility in that the circuitry may be easily varied in accordance with the size of the recirculating memory and the size of the timing means.

The foregoing and other objects, features and advantages of the invention will be apparent from the following more particular description of a preferred embodiment of the invention, as illustrated in the accompanying drawings.

Figure 2:
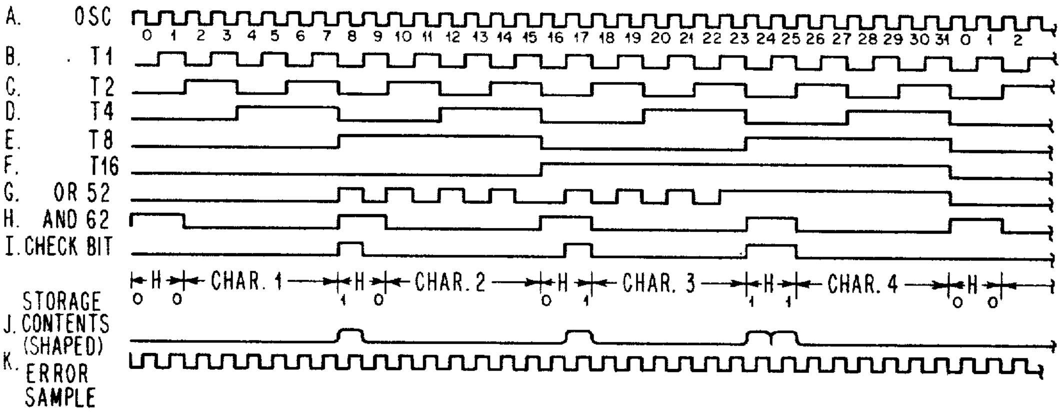

In the drawings:

FIG. 1 is a block schematic diagram of a recirculating memory in which the invention is embodied; and FIG. 2 is a timing chart which illustrates the relative voltage potential of various points in the circuit of FIG. 1.

Referring now to FIG. 1, a storage medium 10 is provided which may be a delay line memory, a track on a magnetic drum or disc, a shift register, or a similar recirculating storage device. A sense amplifier 12 is provided at the output of the storage medium 10 for amplifying, stretching and shaping signals read from the storage medium 10. The output 14 of sense amplifier 12 is fed back to an AND circuit 16, the output 18 of which drives an OR circuit 20. The output 22 of the OR circuit 20 is fed to a driver 24 which provides an input 28 to the storage medium 10.

A basic timing oscillator 30 is provided which generates pulses at a fixed rate at its output 32. The oscillator drives a binary counter 34 having L lower order stages and H higher order stages. In the embodiment shown, a five-stage (T1, T2, T4, T8, and T16) binary counter is employed, but it should be understood that the number of stages is illustrative only and may be varied to adapt to any error checking scheme desired. The outputs 36, 38 of T1 feed AND circuits 40 and 42 respectively. The outputs 44 and 46 of the higher order stages T8, T16 drive the other legs of the AND circuits 40 and 42. The outputs 48, 50 of the AND circuits 40 and 42 are ORed together by OR circuit 52, the output 54 of which is fed to AND circuit 56. The outputs 58, 60 of T2 and T4 are fed to AND circuit 62, the output 64 of which gates AND circuit 56 and feeds inverter 68. The output 70 of AND 56 labeled "check bit" feeds one leg of exclusive OR 72, the other leg of which is fed by the output 14 of sense amplifier 12. The output 74 of exclusive OR 72 gates AND 78, the output 80 of which indicates an error condition.

The output 32 of oscillator 30 drives timing circuit 34 and also feeds inverter 82. The inverted output 84 of the oscillator gates AND circuits 86, 88, 16, 90, and provides error sample to AND 78. The AND circuits 86, 88, 16, and 90 are also energized by the following input lines: data input line 92; synchronize line 94; regenerate line 96; and read out line 98. The synchronize line 94 is inverted by inverter 100, the output 102 of which disables AND circuits 86, 16, and 78. The output 14 of sense amplifier 12 energizes AND circuit 16 and AND circuit 90 which provide respectively, a regenerate input 18 to storage 10 and an output 104 to be utilized by external apparatus:

The outputs 108, 110 of AND circuits 86 and 88 feed OR circuit 20 which provides access to the storage medium 10.

Referring to FIG. 2, the operation and relative timing within the system of FIG. 1 will now be described in detail. Curve A illustrates the output 32 of oscillator 30. The negative going portions are labeled from zero to 31 and correspond to times at which the error sample, the inverted output of oscillator 30, is taken (see also curve K). Curves B–F correspond to the outputs of triggers T1, T2, T4, T8, and T16 of counter 34. The counter is stepped on the positive going portion of oscillator output 32 and the triggers are connected to count in binary coded decimal. Curve G illustrates the output of OR circuit 52 and is obtained by ANDing together the complements of curve B and curve E. Curve H corresponds to the output of AND 62 and is obtained by ANDing together the complements of curves C and D. Curve H defines the period in which the check bits are generated as will be subsequently described. Curve I illustrates the check bits generated at the output of AND 56. Curve J represents the shaped storage contents of the data read by sense amplifier 12.

A unique scheme is employed for gating the H check bits into storage at the proper times in the timing cycle. The bits corresponding to the states of T16 and T8 are gated into storage at check bit times 0, 1; 3, 9; 16, 17; 24, and 25. The lower order stages T1, T2, and T4 are conveniently used to define the check bit times and control the generation of the check bits.

Referring now to the table below the various states of the triggers T1–T16 corresponding to the actual count in the counter from 0 to 31 are illustrated.

| | Count | $T_1$ | $T_2$ | $T_4$ | $T_8$ | $T_{16}$ | | Count | $T_1$ | $T_2$ | $T_4$ | $T_8$ | $T_{16}$ |
|---|---|---|---|---|---|---|---|---|---|---|---|---|---|
| Check Bit Times. | 0 | 0 | 0 | 0 | 0 | 0 | Check Bit Times. | 16 | 0 | 0 | 0 | 0 | 1 |
| | 1 | 1 | 0 | 0 | 0 | 0 | | 17 | 1 | 0 | 0 | 0 | 1 |
| Data Bit Times. | 2 | 0 | 1 | 0 | 0 | 0 | Data Bit Times. | 18 | 0 | 1 | 0 | 0 | 1 |
| | 3 | 1 | 1 | 0 | 0 | 0 | | 18 | 1 | 1 | 0 | 0 | 1 |
| | 4 | 0 | 0 | 1 | 0 | 0 | | 20 | 0 | 0 | 1 | 0 | 1 |
| | 5 | 1 | 0 | 1 | 0 | 0 | | 21 | 1 | 0 | 1 | 0 | 1 |
| | 6 | 0 | 1 | 1 | 0 | 0 | | 22 | 0 | 1 | 1 | 0 | 1 |
| | 7 | 1 | 1 | 1 | 0 | 0 | | 23 | 1 | 1 | 1 | 0 | 1 |
| Check Bit Times. | 8 | 0 | 0 | 0 | 1 | 0 | Check Bit Times. | 24 | 0 | 0 | 0 | 1 | 1 |
| | 9 | 1 | 0 | 0 | 1 | 0 | | 25 | 1 | 0 | 0 | 1 | 1 |
| Data Bit Times. | 10 | 0 | 1 | 0 | 1 | 0 | Data Bit Times. | 26 | 0 | 1 | 0 | 1 | 1 |
| | 11 | 1 | 1 | 0 | 1 | 0 | | 27 | 1 | 1 | 0 | 1 | 1 |
| | 12 | 0 | 0 | 1 | 1 | 0 | | 28 | 0 | 0 | 1 | 1 | 1 |
| | 13 | 1 | 0 | 1 | 1 | 0 | | 29 | 1 | 0 | 1 | 1 | 1 |
| | 14 | 0 | 1 | 1 | 1 | 0 | | 30 | 0 | 1 | 1 | 1 | 1 |
| | 15 | 1 | 1 | 1 | 1 | 0 | | 31 | 1 | 1 | 1 | 1 | 1 |

Examining this table, it is seen that only during check bit times are T2 and T4 both zero. At all other times one or the other of these triggers is on. Further, T1 is in the zero state for the first check bit time of each character, and in the one state for the second check bit time of each character. The states of these triggers are utilized to gate out the check bits in the following manner. The zero sides of T2 and T4 are ANDed together in AND 62. Therefore, the output 64 of AND 62 energizes AND 56 only during check bit times, i.e. when T2 and T4 are both zero. This is illustrated by curve H FIG. 2. The actual check bit value at check bit time is determined by the state T8 and T16. T8 represents the first check bit and T16 represents the second check bit. T1 is used to control the gating of these bits. Thus, when T1 is zero the first check bit corresponding to the state of T16 is gated through AND 40, via OR 52 to energize AND 56. The output of OR 52 is allowed through AND 56 only during check bit times under control of output 64 of AND 62. When T1 changes state the one output 38 gates the second check bit corresponding state of T8 through AND 42. Thus, the check bits are defined by the state of the higher order stages T8 and T16, and are generated at proper clock times under control of the lower order stages T1, T2 and T4.

Synchronism between the delay line and the counter is initially obtained by energizing the synchronize line 94 for one full cycle of the timing circuit 34. This allows the check bits generated at the output of AND circuit 56 to be gated by the basic oscillator pulses through AND circuit 88, OR circuit 20 and into the the storage medium 10. Curve I illustrates the wave shape of the check bit line 70. Since this line is gated by the inverted oscillator output line 84 (to prevent slivers from inadvertently passing through the AND circuit 88) the actual bit stored in the storage medium 10 is only half the duration of a full oscillator cycle. Thus, the output of the storage medium must be shaped by sense amplifier 12 to extend the pulse period to a full oscillator cycle as shown in curve J.

The synchronize line 94 is inverted to disable AND circuits 86, 16, and 78. This prevents inadvertently passing data on data input line 92 or regenerated data on regenerate line 96 into the storage medium. The synchronize line inverted also prevents any error indications by disabling AND circuit 78.

Data is read into the storage medium by energizing data input line 92 during data bit times in a character cycle. If data input line 92 is energized an oscillator pulse on line 84 causes a binary one to be written into the storage medium via AND circuit 86, or 20 and driver 24. At all other times when data input line 92 is deenergized zeros are written into the storage medium.

Data is read out of the storage medium by energizing read out line 98. The shaped data bits then appearing at the output 14 of sense amplifier 12 are sampled by the inverted oscillator output line 84 to sample the data pulses at their midpoint to thus compensate for distortion. The output 104 of AND 90 then represents a train of zeros and ones corresponding to the data stored in the storage medium. The bits stored in the storage medium are continuously recirculated in order that the check bits will not be destroyed. This is accomplished by holding the regenerate line 96 positive. In this manner the output of the sense amplifier 12 is allowed to pass through the AND circuit 16 where it is gated by oscillator pulses 84. The output of AND circuit 16 passes through OR circuit 20 and driver 24 in order that the information may eventually be reinserted into the storage medium 10.

Assuming that the counter and the information stored are in synchronism the following sequence takes place as illustrated by the timing chart of FIG. 2. The first character read from the storage medium 10 is character 1. As illustrated by curve I of FIG. 2 the H bits associated with character 1 should read 00. The shaped output 14 of sense amplifier 12 is illustrated by curve J. At this time of the cycle, illustrated by curve A, the shaped output 14 of sense amplifier 12 (curve J) is compared with the actual state of the counter 34 on line 70 (curve I). At time zero FIGURE T1 is in zero status, so that the output of T16 is gated through AND circuit 42, OR circuit 38, to Exclusive OR 32. Thus, the value of the count of the storage means which was stored in the memory as check bits is compared with the actual decoded count of the counter on line 70. The two should compare, and give no output at the Exclusive OR 72. The positive going portion of the oscillator wave form shown in curve A following time 0 changes trigger T1 to the one state. The output 38 of T1 therefore energizes AND circuit 42. At this time in the cycle of the counter, T16 is off. Therefore, the output 46 disables the output of AND circuit 42, and no signal passes through OR circuit 42 nor through AND circuit 56. Therefore the check bit leg 70 of Exclusive OR 72 remains negative and no error is indicated. The storage medium contents illustrated by curve J at time 1 are also negative because no check bit was prerecorded at this time. Therefore the comparison of the storage content with the time indicated by the counter in Exclusive OR 72 results in no output therefrom.

An analogous sequence takes place at check bit times 8 and 9. At time 8 the check bit read from storage should be a 1 (curve J). The contents of counter 34 should generate a 1 on check bit line 70. If the memory is synchronized the two compare and no error is indicated. However, should the counter be out of step and line 70 negative at this time, an output will occur from Exclusive OR 72. When the Exclusive OR is sampled at time 8 by error sample 84 (curve K) an error signal will occur on line 80.

To summarize, the invention provides an improved checking circuit for checking a recirculating memory which is synchronized by a timing circuit. The invention comprises means for storing bits corresponding to certain times indicated by the timing circuit at selected positions in the memory between data bits. The stored times are then compared with the actual times indicated by the timing means as the bits are recirculated. Means are also provided for automatically synchronizing the storage medium with the timing circuit should the synchronization be lost.

While the invention has been particularly shown and described with reference to a preferred embodiment thereof it will be understood by those skilled in the art that various changes in form and details may be made therein without departing from spirit and scope of the invention.

What is claimed is:

1. In a recirculating storage medium having a plurality of data bit positions therein,
- a reading station for reading data stored in said medium;
- a timing means for generating timing pulses corresponding to bit positions in said storage medium, said timing means comprising L lower order stages and H higher order stages of a counter;
- means for decoding the outputs of said lower order stages;
- means responsive to the decoded outputs for inserting the value of said higher order stages into bit positions of said storage medium corresponding to decoded times indicated by the lower order stages of said counter;
- comparing means for comparing the value of recirculated bits read from said storage medium with the actual value of said higher order stages of said counter at times indicated by the lower order stages; and
- means responsive to an unequal comparison for indicating a lack of synchronism between said storage means and said timing means.

2. In combination with a recirculating memory:
- a timing means for synchronizing data stored in said memory;
- means for storing certain times indicated by said timing means at selected positions in said memory; and
- means for comparing the stored times read from said memory with the actual times indicated by said timing means.

3. A recirculating storage medium having a plurality of bit positions therein;
- timing means for generating timing pulses corresponding to bit positions in said storage medium;
- means for inserting selected values of said timing means as check bits in said memory; and
- means for comparing the value of the check bits read from said storage means with the actual value of said timing means.

4. A source of timing pulses;
- means for counting said pulses, comprising a plurality of counting stages;
- a recirculating storage medium;
- means for decoding the outputs of selected ones of said counting stages to thereby generate timing signals corresponding to predetermined numbers of said timing pulses;
- means for gating said decoded signals into said recirculating storage medium for storage therein;
- means for reading said stored signals; and
- means for comparing the stored signals during recirculation with the generated timing signals for a one-to-one correspondence.

5. A recirculating storage medium;
- a timing circuit for synchronizing data read into and out of said storage medium, said timing circuit having a unique configuration of states for each interval of a timing cycle;
- means for reading pulses representing a particular state of said timing circuit into said storage medium at a predetermined interval to provide check bits therein;
- means for reading data from said storage medium;
- means for comparing data read from said storage medium with pulses representing the state of said timing circuit at times when the stored check bits should appear at the output of said storage medium, and for emitting a signal when a comparison does not exist; and
- means responsive to the output of said comparing means for indicating a lack of synchronism between said timing means and said storage medium.

6. In combination with a serial cyclic memory system wherein information bits are repeatedly circulated through said system at a predetermined rate and are passed serially through a reading device once during each circulation,
- timing means for synchronizing the information bits with the reading device;
- means for generating check bits corresponding to certain times indicated by said timing means;
- means for storing said check bits in said memory system at predetermined locations therein; and
- means for comparing the times indicated by said checking bits as read from the reading device with the actual times indicated by said timing means, thereby an equal comparison results if said timing means and said memory are in synchronism.

7. Apparatus for checking a recirculating memory comprising:
- a timing means;
- a check bit generating circuit responsive to said timing means for generating check bits synchronized with said timing means and having a different configuration at different times in a cycle of said timing means;
- means for storing said check bits in the memory at predetermined times in a cycle of said timing means;
- means for reading the recirculated check bits from the memory, and
- means responsive to said generator and said reading means for comparing the configuration of said stored check bits with the generated check bits.

References Cited

UNITED STATES PATENTS

| | | | |
|---|---|---|---|
| 3,064,241 | 11/1962 | Schneider | 340—173 |
| 3,153,776 | 10/1964 | Schwartz | 340—172.5 |

PAUL J. HENON, *Primary Examiner.*

P. L. BERGER, *Assistant Examiner.*